United States Patent Office 3,251,681
Patented May 17, 1966

3,251,681
METHOD OF STIRRING A MOLTEN METAL IN A TRANSFER LADLE
Kohei Wakamatsu, Amagasaki-shi, Tomiichi Sumi, Nishinomiya-shi, and Seiji Ban, Kobe, Japan, assignors to Amagasaki Iron & Steel Mfg., Co., Ltd., Minami-ku, Osaka, Japan, a corporation of Japan
Filed Nov. 13, 1962, Ser. No. 237,193
12 Claims. (Cl. 75—61)

The present invention relates to methods of stirring a molten metal in a transfer ladle to mix the metal in a minimized period of time for the purpose of removing impurities from the molten metal or adding an alloying material or materials, thereto, or for other refining purposes.

According to one aspect of the present invention, there is provided a method of oscillatorily stirring a molten metal in a vessel such as a transfer ladle which comprises eccentrically revolving the vessel or imparting a circular orbitary motion to the vessel alternately in one direction and the other. By utilization of the present invention, it is now possible to perform desulfurization, dephosphorization, desiliconization or other metal refining procedure upon a molten metal bath in a transfer ladle in a minimized period of time and with substantial uniformity. For example, desulfurization may be efficiently performed by oscillatorily stirring the molten metal bath according to the invention after a desulfurizing agent has been added to the top surface of the bath. The present invention may also be utilized in the manufacture of alloys by adding alloying elements to a molten metal bath in a transfer ladle. In this application, the alloying elements can be quickly and uniformly mixed with the melt irrespective of the specific gravity of the alloying element added to obtain a desired alloy. Similarly, the present invention is also applicable to the manufacture of spheroidal graphite cast iron.

The present invention will now be described in detail with reference to the accompanying drawings, in which:

FIG. 13 is a vertical cross section of a modified form of part of the apparatus shown in FIGS. 11 and 12;

According to one aspect of the present invention, there is provided a method of stirring and mixing a molten metal bath contained in a vessel 1 (FIG. 1) such as a transfer ladle which comprises imparting to the vessel orbitary or eccentric rotary motion alternately in one direction and the other in cycles each including, for example, one revolution in either direction, two revolutions in one direction and one in the other, or three revolutions in one direction and one in the other, thereby to cause different movements in the metal bath such as including movement and reversing undulatory movement. The present invention will first be described by way of example in connection with its application to the removal of impurities from a molten metal bath.

A mass of liquid 1' (FIG. 1) such as water is contained in a cylindrical vessel. An orbitary or eccentric rotary movement is imparted to the vessel by suitable means without rotating the vessel on its own axis. With the rotation of the vessel, the water is rotated with its level forming a curved surface 1" (schematically shown in FIG. 2) which is paraboloidal, as will readily be understood. On this occasion, part of the water rises from its normal level as typically shown in FIG. 2. In this figure, the distance $h$ represents the largest rising distance as measured vertically along the side wall of the vessel, that is, the vertical distance of the highest point on the curved surface of the water in motion from the normal level surface of the water when held still.

When the vessel is rotated with an eccentricity of 15 mm., the largest rising distance $h$ as measured along the side wall first increases with the speed of rotation but in the range of speed exceeding 90 revolutions per minute the motion of the water cannot follow the rotation of the vessel, as indicated by the solid-line, and surface waves like those on a chopping sea or "chopping waves" as so called herein are formed. With an eccentricity of 30 mm., the rising distance of the water reaches a maximum at the speed of 66 r.p.m. and then diminishes to a minimum subsequently increasing again, as indicated by the broken-line. In case of the eccentricity of 50 mm., the general tendency is the same, but the maximum rising distance is smaller and obtained at a lower speed of rotation as indicated by the dot-dash line.

On the other hand, the motion of the water in the vessel grows vigorous as the speed of rotation thereof increases. In other words, in FIG. 4 for example, only the surface layer of the water is set in motion at lower speeds of rotation, but as the speed increases, the moving layer grows progressively inwardly until the entire mass of water begins to rotate at a uniform angular speed and which angular speed thereafter is gradually increased.

Figure 5:
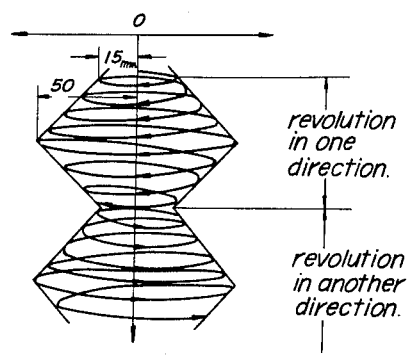
FIG. 5 is a diagram showing the variation in the eccentricity of the orbitary motion imparted to the vessel employed in the experiments.

The present invention utilizes the motion of the bath when the entire bath is rotated at a uniform angular velocity or at least until the entire mass of water rotates in the same direction. Under this condition, the water in the vessel attains a steady state immediately after it has all started to rotate, not causing any substantial mixing action with the exception that waves are formed by the interaction of the bath and the side wall of the vessel. However, the water is heavily disturbed in case eccentric rotary movement is imparted to the vessel in a direction opposite to that in which the water therein has been rotated. The process in this case will now be described. It is assumed that when the mass of water is rotating clockwise an eccentric rotary movement is imparted to the vessel counterclockwise. The mass of water will start to swirl inwardly downwardly to effect so-called including or mixing motion while rotating clockwise. Such motion continues for several seconds or about ten seconds until the momentum of the clockwise rotating mass is balanced. Then, surges or reversing waves are formed to run counterclockwise along the vessel wall. The surges continue for several seconds and go down to restore the water to a steady state. On this occasion, it has been found that the time duration as well as the intensity of the different motions of the water such as including motion and surges can be controlled by selecting the manner in which the counterrotating movement is imparted to the vessel. Specifically, the motions of the water bath can be controlled by gradually varying the eccentricity or by selecting the time delay in reversing the rotation of the vessel or alternatively by selecting the magnitude of the eccentricity. Moreover, the converging or diverging angle of the side wall of the cylindrical vessel has an important influence upon the motions in affecting the depth of vortices, the occurrence of the spouting at the center and its duration, and the time at which the reversing waves occur. FIG. 5 diagrammatically illustrates the relationship between the variation in eccentricity and the time durations of the eccentric rotation in respective directions. In this example, initial rotation is given in one direction with an eccentricity of 15 mm. and is gradually increased in speed while the eccentricity is being increased to 50 mm. During this period, the water in the vessel runs at considerably high speeds and remains in a steady state not producing any substantial surging. The mixing of the water at this stage is naturally not so vigorous. Thereafter, the eccentricity is gradually reduced to approximately 15 mm., when the vessel is stopped momentarily and then rotated contrariwise. The mixing of the water is effected most efficiently after such reversal of the rotation and before the eccentricity, which is again gradually increased, reaches a value such that the water again assumes a steady state. By repeating this procedure, the desired mixing of the water can be accomplished in a minimized period of time, as will readily be appreciated.

At any rate, the steady state of the water bath is destroyed by reversing the rotary movement of the vessel and a satisfactory mixing and stirring motion can be effected which can never be realized by a simple unidirectional rotation. To obtain the highest possible efficiency, however, the conditions of the rotary movement must be selected in a definite range, as will readily be understood.

The results of experiments conducted with a vessel having a vertical side wall and a vessel having an upwardly diverging side wall are listed in Tables 1 to 4, which follow:

TABLE 1

Figure 3:
FIGS. 3 and 4 illustrate dimensions of further examples of the vessel employed in the experiments.

*Motion of water in the vessel of FIG. 3 having a vertical side wall when the vessel is rotated in opposite directions*

| Motion of vessel | | Motion of water | | | | Time required to attain a steady state | Mixing and stirring effect |
|---|---|---|---|---|---|---|---|
| Eccentricity | R.p.m. | Swell or chopping waves | Including motion | Chopping waves or still | Reversing waves | | |
| 15 mm. | 54 | — | — | — | — | ------ | x |
| | 60 | Slightly ⊕ | — | — | — | ------ | x |
| | 66 | — | — | ⊕ | ⊕ | ------ | x |
| | 72 | — | — | ⊕ | ⊕ | c. 13 sec. | Slightly ○ |
| | 78 | — | — | ⊕ | ⊕ | c. 50 sec. | Slightly ○ |
| | 84 | — | — | ⊕ | ⊕ | c. 3 min. | Slightly ○ |
| | 90 | — | — | ⊕ | ⊕ | ------ | Slightly ○ |
| 30 mm. | 54 | — | — | — | ⊕ | Immediately | x |
| | 60 | — | — | — | ⊕ | Immediately | x |
| | 66 | — | — | — | ⊕ | Immediately | x |
| | 72 | — | — | — | ⊕ | c. 10 sec. | ○ |
| | 78 | — | 8 sec. ⊕ | — | ⊕ | c. 16 sec. | ○ |
| | 84 | — | 10 sec. ⊕ | 20 sec. ⊕ | ⊕ | c. 30 sec. | ○ |
| | 90 | — | 15 sec. ⊕ | 50 sec. ⊕ | ⊕ | c. one min. | ○ |
| 50 mm. | 54 | — | — | — | ⊕ | Immediately | ○ |
| | 60 | — | — | — | ⊕ | 4 sec. | ○ |
| | 66 | — | — | — | ⊕ | c. 5 sec. | ○ |
| | 72 | — | — | — | ⊕ | c. 6 sec. | ○ |
| | 78 | — | 4 sec. ⊕ | — | 5 sec. ⊕ | c. 9 sec. | ◎ |
| | 84 | — | 6 sec. ⊕ | — | 4 sec. ⊕ | c. 10 sec. | ◎ |
| | 90 | — | 5 sec. ⊕ | — | 5 sec. ⊕ | c. 10 sec. | ◎ |

Note.—⊕ Occurrence; — Nonoccurrence; x None; ○ Fair; ◎ Good.

TABLE 2

Figure 4:

*Motion of water in the vessel of FIG. 4 having an upwardly divergent side wall when the vesssel is rotated in opposite directions*

| Motion of vessel | | Motion of water | | | | Time required to attain a steady state | Mixing and stirring effect |
|---|---|---|---|---|---|---|---|
| Eccentricity | R.p.m. | Swell or chopping waves | Including motion | Chopping waves | Reversing waves | | |
| 15 mm. | 54 | ⊕ | — | — | — | -------- | x |
| | 60 | — | — | — | ⊕ | -------- | x |
| | 66 | — | — | — | ⊕ | c. 30 sec. | x |
| | 72 | — | — | ⊕ | ⊕ | c. 2 min. 15 sec. | x |
| | 78 | — | Slightly, 10 sec. ⊕ | ⊕ | — | c. 5 min. 15 sec. or over | x |
| | 84 | ⊕ | — | — | — | -------- | x |
| | 90 | ⊕ | — | — | — | -------- | x |
| 30 mm. | 54 | ⊕ | — | — | — | -------- | x |
| | 60 | — | — | — | 2 sec. ⊕ | -------- | ○ |
| | 66 | — | — | — | ⊕ | -------- | ○ |
| | 72 | — | 4 sec. ⊕ | ⊕ | ⊕ | 15 to 20 sec. | ⊚ |
| | 78 | — | 10 sec. ⊕ | ⊕ | ⊕ | c. 15 sec. | ⊚ |
| | 84 | — | Violent ⊕ | ⊕ | — | 10 min. or over | Continuous operation possible ○ |
| | 90 | — | — | Violent ⊕ | — | 10 min. or over | x |
| 50 mm. | 54 | — | — | — | ⊕ | c. 4 sec. | x |
| | 60 | — | — | — | ⊕ | c. 5 sec. | ○ |
| | 66 | — | — | — | ⊕ | c. 10 sec. | ○ |
| | 72 | — | 5 sec. ⊕ | — | 5 sec. ⊕ | c. 10 sec. | ⊚ |
| | 78 | — | 12 sec. ⊕ | — | 5 sec. ⊕ | c. 10 sec. | ⊚ |
| | 84 | — | 10 sec. ⊕ | — | 5 sec. ⊕ | -------- | ○ |
| | 90 | — | 9 sec. ⊕ | — | ⊕ | -------- | ○ |

NOTE.—⊕ Occurrence; — Nonoccurrence; x None; ⊚ Fair; ⊚ Good.

TABLE 3

*Motion of water in the vessel of FIG. 3 when the vessel is rotated in opposite directions while varying the eccentricity (the vessel and the volume of water used are the same as in Table 1)*

| R.p.m. | Motion of water | | | | | Possibility of continuous operation | Effective mixing time | Effective mixing time rate, percent |
|---|---|---|---|---|---|---|---|---|
| | Including motion | Spouting | Chopping waves or still | Reversing waves | Normal waves | | | |
| 60 | — | — | — | ⊕ | ⊕ | | | |
| 66 | — | — | ⊕ | ⊕ | ⊕ | | | |
| 72 | 2 sec. ⊕ | — | — | ⊕ | ⊕ | Possible | 7 sec. | 37 |
| 78 | 5 sec. ⊕ | — | — | 5 sec. ⊕ | ⊕ | Possible | 10 sec. | 53 |
| 84 | 7 sec. ⊕ | — | — | 5 sec. ⊕ | ⊕ | Possible | 10 sec. | 53 |
| 90 | 8 sec. ⊕ | — | — | 5 sec. ⊕ | ⊕ | Possible | 13 sec. | 68 |

NOTE.—⊕ Occurrence; — Nonoccurrence.
Effective mixing time rate=effective mixing time/cycle period×100.
(Where the cycle period is the time elapsing before the effective mixing is initiated.)

TABLE 4

*Motion of water in the vessel of FIG. 4 when the vessel is rotated in opposite directions while varying the eccentricity (the vessel and volume of water used are the same as in Table 2)*

| R.p.m. | Motion of water | | | | | Possibility of continuous operation | Effective mixing time | Effective mixing time rate, percent |
|---|---|---|---|---|---|---|---|---|
| | Including motion | Spouting | Chopping waves or still | Reversing waves | Normal waves | | | |
| 60 | — | — | — | ⊕ | ⊕ | | | |
| 66 | — | — | Slightly ⊕ | ⊕ | ⊕ | Possible | 8 sec. | 23 |
| 72 | 2 sec. ⊕ | — | — | ⊕ | ⊕ | Possible | 13 sec. | 37 |
| 78 | 5 sec. ⊕ | — | — | 5 sec. ⊕ | ⊕ | Possible | 15.5 sec. | 44 |
| 84 | 7 sec. ⊕ | — | — | 5 sec. | ⊕. | Possible | 14 sec. | 20 |
| 90 | 8 sec. ⊕ | — | — | 5 sec. ⊕ | ⊕ | Possible | 14 sec. | 20 |

NOTE.—⊕ Occurrence; — Nonoccurrence.
Effective mixing time rate=effective mixing time/cycle period×100.
(Where the cycle period is the time elapsing before the effective mixing is initiated.)

Incidentally, the relationship between the eccentricity and the mixing time as employed in the above experiments is illustrated in FIG. 5.

In the above, the mixing and stirring operation has been described in connection with the case where the vessel is not rotated on its own axis which is vertical, but the same effect may also be obtained in cases where the vessel is rotated on its own axis while being eccentrically rotated or effecting an orbitary motion. In one such case, the vessel has its own axis inclined at an angle to the vertical and is rotated on its own inclined axis while being moved in a manner such that the axis of the vessel itself traces a conical surface. The movement of the vessel in this case is more or less similar to the precessional motion of a spinning top. It will be appreciated that the mixing and stirring operation can be performed extremely efficiently by continuing such movement of the vessel.

Though description has been made hereinbefore in connection with the stirring and mixing operation of water, it will be understood that the identical movement may also be imparted to any molten metal or alloy bath by the same procedure. Only, in this case, the difference in specific gravity, viscosity and other properties of such melt from water should be taken into consideration.

The inventive method of mixing and stirring a bath can be utilized in removal of impurities such as sulfur, phosphorus, and silicon from the melt. The off-furnace desulfurization of a bath of molten cast or pig iron will first be described as an example of operation to which the method may readily and conveniently be applied.

Figure 1:
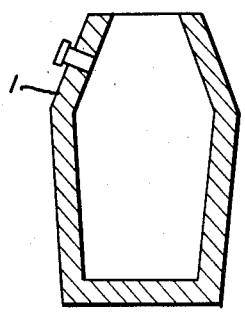
FIG. 1 is a vertical cross-section of one example of the vessel which is usable in practising the present invention.
Figure 2:
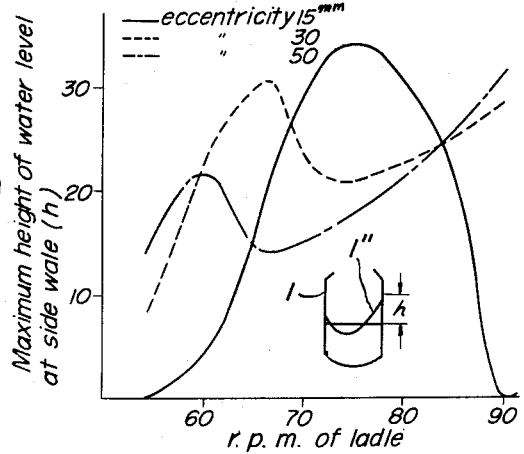
FIG. 2 is a graphical representation of the relationship between the maximum rising distance of water or other liquid contained in a cylindrical vessel as measured along the side wall thereof when the vessel is given an orbitary or eccentric rotary motion and the speed of rotation of the vessel.

It is assumed that a vessel such as a transfer ladle shown in FIG. 1 contains a bath of molten cast or pig iron and a desulfurizing agent is added to the top of the bath. As long as the bath stands still, the desulfurizing agent is simply afloat on the bath surface because of its smaller specific gravity and only a very slight contact reaction takes place between the melt and the desulfurizing agent added.

The contact reaction remains unsatisfactory even when the ladle is rotated simply in one direction, since this only results in the promotion of the contact reaction due to the increase in surface area of the melt bath and to the formation of waves under the influence of the side wall of the vessel. Incidentally, the desulfurizing or other refining procedures recently in use in European countries and employing an oscillating ladle only include such rotation of the ladle in a definite direction. In the inventive method, which employs eccentric rotation alternately in forward and reverse directions, the desulfurizing agent afloat on the bath surface is vigorously included or swirled into the interior of the bath and violently mixed therewith to cause a contact reaction which is highly efficient compared with that obtainable in any of conventional rotary furnaces. As a result, the melt is rapidly desulfurized at a highly improved rate.

Desiliconization of the melt according to the present invention is performed in the following manner. Customarily, desiliconization is performed by blowing oxygen gas through a lance onto the surface of the bath of cast or pig iron melt. However, in case the bath stands still, the silicon content in the surface layer is markedly reduced as compared to the interior of the bath. Also, the surface temperature of the bath is considerably raised to cause combustion of carbon. Under these circumstances, the variation in silicon content of the melt may be effectively eliminated by performing the mixing and stirring operation according to the invention. Incidentally, the rise of the melt temperature and the proportion of other elements, for example, the carbon content, of the melt can be controlled by controlling the blowing conditions of oxygen gas and the conditions under which the metal bath is moved.

Dephosphorization of a melt according to the invention is performed as follows. In the process of dephosphorization, P is first oxidized to form $P_2O_5$ or $(FeO)_3 \cdot P_2O_5$ and is further combined with CaO to produce a stable compound, $(CaO):P_2O_5(CaO)_3 \cdot P_2O_5$ or $(CaO)_4 \cdot P_2O_5$, which is subsequently removed.

The oxygen-blowing method of refining a molten metal bath when performed while imparting thereto an oscillatory movement according to the present invention has the following advantages. The temperature rise of the bath is limited compared with the case in which the bath is kept still and is favorable for prevention of the formation of FeO. Further, the stirring is effected uniformly promoting the formation of $P_2O_5$ or $(FeO)_3 \cdot P_2O_5$. The reaction with CaO is also expedited by the thorough mixing and stirring operation. The limited temperature rise acts to improve the refining efficiency and accordingly the dephosphorization can be rapidly completed while maintaining the high carbon content.

As pointed out above, the removal of impurities can be performed with great success by the stirring and mixing procedure including eccentric rotation of the vessel in opposite directions. A practical example of such procedure will be described below.

A cast iron melt was desulfurized with powdered calcium carbide. The ladle employed was of the same form as used in Table 2, and rotated at 90 r.p.m. while varying the eccentricity in the same manner as in Tables 3 and 4.

Table 5 illustrates the composition of a cast iron melt which was subjected to the desulfurizing process consecutively for six minutes with powdered calcium carbide added to the top of the melt in an amount of 5 to 25 kg. per ton of melt. Table 6 illustrates the relationship between the working time and the sulfur content, desulfurizing rate and temperature when 1150 kg. of cast iron melt was refined with 15 kg. of powdered calcium carbide added to the top thereof.

TABLE 5

| Amount of calcium carbide added | 5 kg. | 10 kg. | 15 kg. | 20 kg. | 25 kg. |
| --- | --- | --- | --- | --- | --- |
| Initial S content, percent | 0.098 | 0.089 | 0.097 | 0.084 | 0.093 |
| S content 6 min. after the start of addition, percent | 0.023 | 0.006 | 0.010 | 0.006 | 0.010 |
| Desulfurization rate, percent | 76.5 | 93.2 | 89.7 | 92.8 | 89.3 |
| Initial temperature, °C | 1,473 | 1,468 | 1,450 | 1,458 | 1,453 |
| Temperature 6 min. after, °C | 1,412 | 1,408 | 1,378 | 1,408 | 1,406 |

TABLE 6

| | Sulfur content, percent | Desulfurization rate, percent | Temperature, °C |
| --- | --- | --- | --- |
| At start | 0.111 | | 1,468 |
| 2 min. after | 0.022 | 80.2 | 1,443 |
| 4 min. 34 sec. after | 0.013 | 88.3 | 1,423 |
| 7 min. 8 sec. after | 0.010 | 90.9 | 1,400 |
| 9 min. after | 0.007 | 93.7 | 1,390 |
| 11 min. 37 sec. after | 0.007 | 93.9 | 1,370 |

NOTE.—The vessel movement was momentarily interrupted for sampling; Desulfurization rate = (initial S content) − (final S content)/(initial S content) × 100.

Description will now be made in connection with the procedure of alloying molten metal in a ladle in accordance with the method of the present invention.

Assume that alloying element or elements are added onto the surface of the melt. In case the melt stands still, some alloying elements remain afloat while others sink depending upon their specific gravity relative to that of the melt. The elements afloat are subject to oxidation and other losses due to the temperature rise, and those which sink apparently cannot be mixed uniformly with each other as well as with the melt.

In case the melt bath is simply rotated in a definite direction, it is only expected that a slight disturbance of the melt occurs due to surges forming along the side wall of the vessel and that the dissolution of the alloying elements is accelerated by the rotation of the entire mass of melt.

On the other hand, in case the above described rotation is given to the bath alternately in opposite directions, the floating additives are violently swirled into the interior of the bath while the settlings undergo vertical and rotational forces. The additives are thus rapidly and uniformly mixed with the entire bath and their utilization factor is highly improved.

For instance, the results when ferrosilicon is added to a cast iron melt are listed in Tables 7 and 8. No. 2 ferrosilicon of a particle size of approximately 5 mm. was added in an amount of 13.5 kg. per ton of melt in Table 7 and the same material of a particle size of approximately 25 mm. was added in the same amount in Table 8.

TABLE 7

| | Si content, percent | Utilization factor, percent | Melt temperature, °C |
| --- | --- | --- | --- |
| Before adding | 1.58 | | 1,429 |
| 2 min. 30 sec. after adding | 2.61 | 98.4 | 1,344 |
| 5 min. after adding | 2.60 | 97.2 | 1,336 |

NOTE.—Si utilization factor = actual rise in Si content/theoretical rise in Si content × 100.

TABLE 8

| | Si content, percent | Utilization factor, percent | Melt temperature, °C |
| --- | --- | --- | --- |
| Before adding | 1.45 | | 1,432 |
| 2 min. 40 sec. after adding | 2.39 | 89.5 | 1,358 |
| 4 min. 40 sec. after adding | 2.35 | 86.7 | 1,359 |
| 6 min. 58 sec. after adding | 2.40 | 90.4 | 1,329 |

As observed, a very high utilization factor and uniform distribution of additives can be obtained according to the present invention by eccentrically rotating the vessel alternately in one direction and the other as described hereinbefore.

The method of the present invention can also be utilized in adding a graphite spheroidizing agent to a melt in a ladle to produce spheroidal graphite cast iron, as described below.

Now it is assumed that a graphite spheroidizing agent is added to the top surface of a cast iron melt contained in a transfer ladle as illustrated in FIG. 1.

In case the molten metal bath stands still, any uniform mixing cannot be attained because of the difference in specific gravity, but only the graphite contained in the surface layer is spheroidized. Also, in case a simple unidirectional rotary motion is imparted to the melt, it is only expected that a slight disturbance of the melt occurs due to surges forming along the side wall of the ladle and that the dissolution of the agent added is accelerated by the rotation of the entire mass of melt.

On the other hand, is case the aforesaid reciprocal rotation is given to the bath, the additive afloat on the surface is violently swirled into the interior of the bath and thus efficiently mixed therewith so that the entire mass of the melt bath is subjected to uniform spheroidization. Also, seeding may subsequently be performed very effectively if a similar movement is imparted to the bath being seeded.

The graphite spheroidization which according to the invention utilizes the mixing and stirring of the melt bath may suitably employ any Ca-base spheroidizing agent which acts relatively moderately.

Desulfurization, which precedes the addition of a graphite spheroidizing agent, may also be carried out extremely smoothly giving satisfactory results by the utilization of the aforesaid mixing and stirring movement of the bath.

One practical example of the production of spheroidal graphite cast iron according to the present invention will now be described. The process included steps of (1) resulfurization, (2) slag removal, (3) addition of Ca-base spheroidizing agent and flux, and (4) seeding in that order. As a desulfurizing agent powdered calcium carbide was added in an amount of 15 kg. per ton of melt. The eccentric rotary movement according to the present invention was imparted to the vessel for a period of 3 minutes and 36 seconds and the slag formed was removed. Then, a mixture of 20 kg. of No. 2 R—Ca—Si of medium particle size and 6.5 kg. of fluorspar was added and the vessel was again rotated in the same manner for 3 minutes and 15 seconds. Finally, 3.0 kg. of Ca-Si as a seeding agent was added and the vessel was similarly rotated for one and a half minutes.

A number of preferred forms of apparatus for performing the oscillatory mixing method according to the present invention will be described hereinafter.

Figure 6:
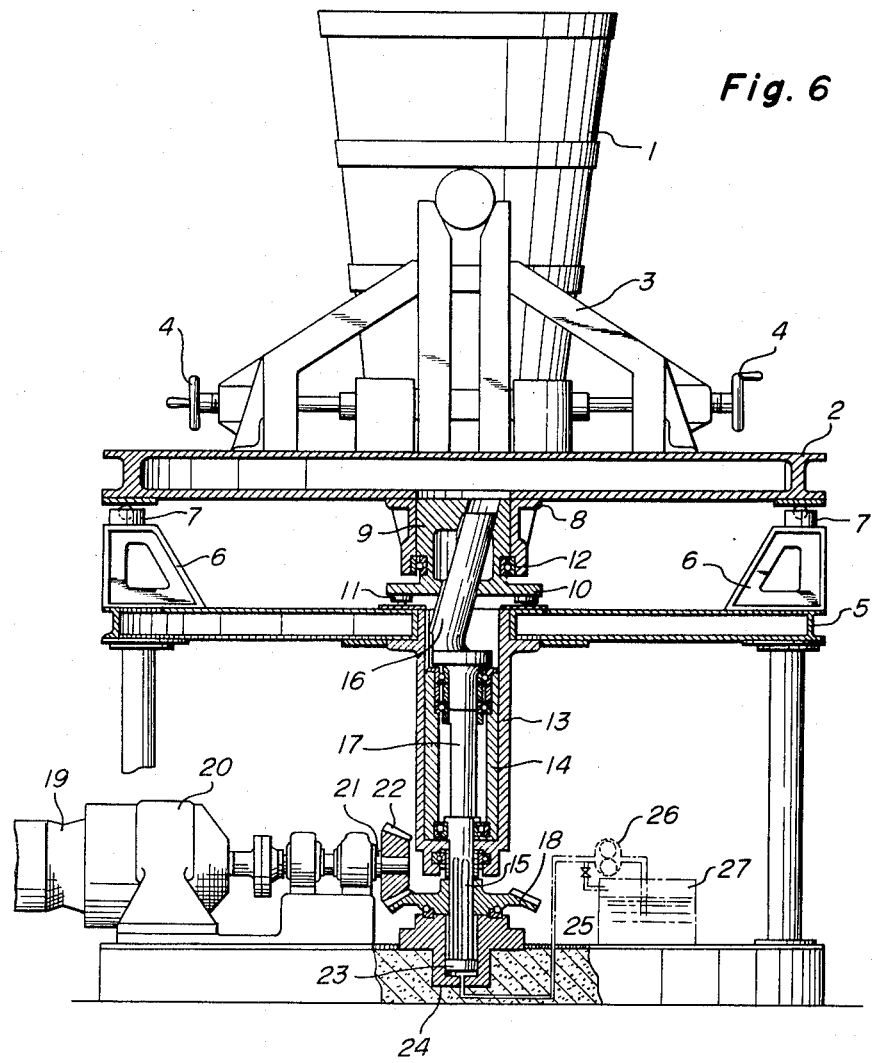
FIG. 6 is a fragmentary cross-sectional elevation of a form of oscillating apparatus embodying the present invention.

In FIG. 6, there is illustrated an oscillatorily stirring apparatus having a mounting frame 2, on which the vessel or ladle 1 is mounted by way of a support structure 3. The structure 3 includes handles 4 for clamping the bottom portion of the ladle 1. A stationary frame 5 carries a number of support brackets 6 arranged in spaced-apart relation to each other. The mounting frame 2 rests on the support brackets by way of special bearings 7, as illustrated. A lap 8 is mounted centrally of the mounting frame 2 and fitted to the lap is an eccentric sheeve 9, which is formed at the bottom with a radial flange 10 and supported by the stationary frame 5 by way of special bearings 11 secured to the radial flange 10. Ball bearings 12 are interposed between the lap 8 and the sheave 9 to allow relative rotation therebetween.

A hollow cylinder 13 is mounted centrally of the base frame 5 and a crankshaft 17 is rotatably journaled in the cylinder by way of a bearing sleeve 14. The crankshaft 17 is splined at the bottom as indicated at 15 and is formed at the top with an inclined arm or crank 16 adapted to fit in said sheave 9. A bevel wheel 18 is fitted over the splined portion 15 of the crankshaft and is in mesh with a bevel pinion 22 fixed to a drive shaft 21, which in turn is connected with a drive motor 19 through the intermediary of a speed change gear 20. The extreme bottom of the crankshaft 17 is formed cylindrical as at 23 forming a wall of an oil pressure chamber 24, which is connected to an oil reservoir by way of an oil conduit 25 and a gear pump 26.

Figure 7:
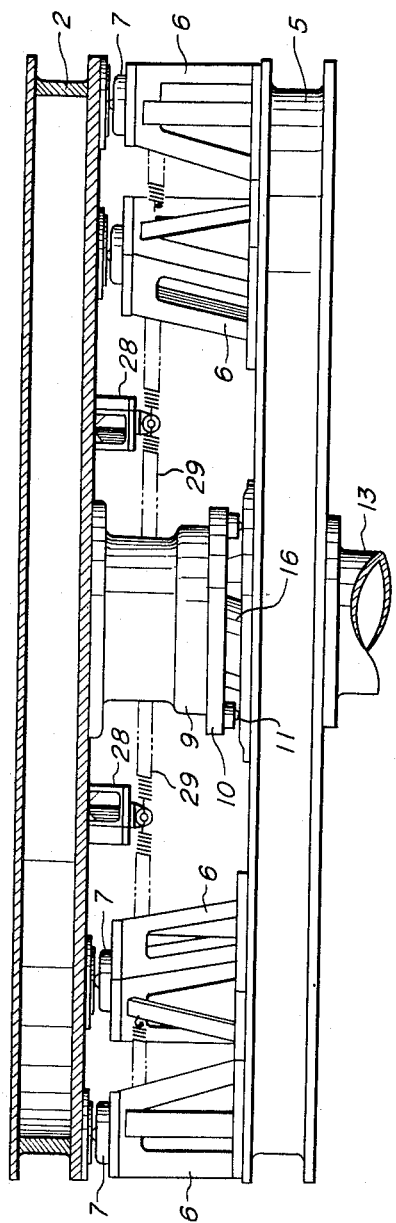
FIG. 7 is a fragmentary enlarged view showing a modified part of the apparatus shown in FIG. 6.

A modification of the above apparatus is shown in FIG. 7, which includes a ladle-mounting frame 2, a number of support legs 28 arranged about the periphery of the frame at equal angular intervals, stationary frame 5 carrying a number of support brackets 6, and tension springs 29 arranged between the support legs 28 and brackets 6 in an annular configuration. The abovementioned special bearings 7 and 11 are not shown in any detail here but are each comprised of a relatively large ball and three thrust races arranged to rotatably support said ball. It is to be understood that the lower structure of the apparatus shown in FIG. 7 includes drive means and is similar to that shown in FIG. 6.

In operation of either of the apparatus shown in FIGS. 6 and 7, the crankshaft 17 is driven from motor 19, which rotates bevel wheel 18 secured to said crankshaft by way of the speed change gear. The rotation of the crankshaft imparts eccentric motion to the lap 8 fitted over the top thereof and therefore to the ladle-mounting frame 2. It is to be understood, therefore, that the ladle may effect reciprocatory rotation with an eccentricity which may be varied steplessly as required.

Particularly in operation of the modified apparatus shown in FIG. 7, the rotation of the ladle-mounting frame 2 relative to the base frame 5 is resiliently restricted by tension springs 29, which are arranged between each of support legs 28 depending from the ladle-supporting frame 2 and the adjacent support brackets 6 on the base frame 5, as pointed out above. It will be understood that the resilient energy built up in the springs when stretched is subsequently released to impart to the ladle-supporting frame 2 a secondary oscillatory movement in addition to the rotary motion imparted thereto by the crankshaft and thus to increase the relative motion between molecules of the melt.

Moreover, as will readily be appreciated, any initial violent oscillation may be effectively avoided to prevent the bath from splashing out of the vessel by initially maintaining the crankshaft at its lowermost position to provide for the least eccentricity. The crankshaft may subsequently be raised gradually by hydraulic means known per se to increase the eccentricity of the rotary motion of the vessel. By proceeding in this manner, the mixing and stirring efficiency is highly improved, as will readily be appreciated. Further, it is possible with this apparatus to obtain vertical and attendant rising and falling disturbances by vertically reciprocating the crankshaft suddenly to baffle the streams of the melt in the vessel.

Figure 8:
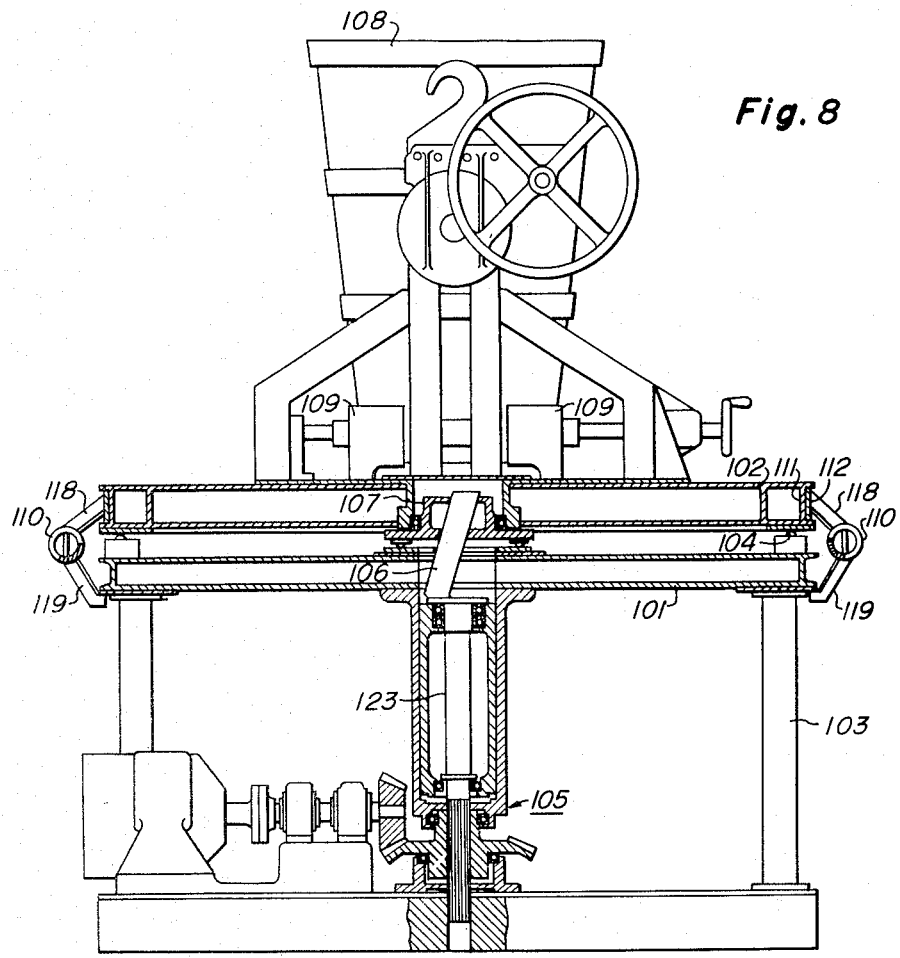
FIGS. 8 and 9 illustrate a further form of oscillating apparatus of the invention, representing a side elevation, partly in cross section, and a partly cutaway plan view of the apparatus, respectively.
Figure 9:
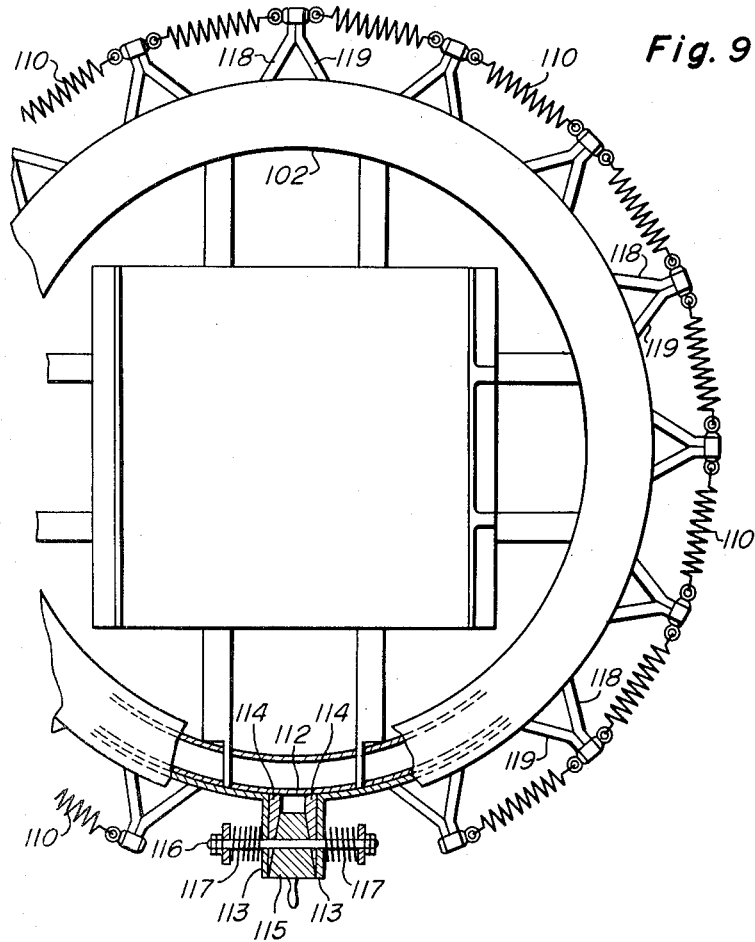
Figure 10:
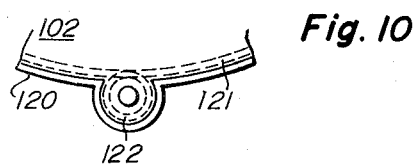
FIG. 10 illustrates a modification of a part of the apparatus shown in FIGS. 8 and 9.

A further embodiment of the apparatus of the present invention is shown in FIGS. 8 and 9, which includes a ladle mounted for tilting movement in any desired vertical plane containing the axis of the apparatus.

Referring to FIGS. 8 and 9, the apparatus shown includes an upper movable frame 102 and a lower stationary frame 101 vertically opposite thereto. The stationary frame 101 is supported by posts 103. The movable frame 102 rests upon a number of freely rotatable balls 104 mounted on the top of the stationary frame and thus is movable in a horizontal plane.

An oscillating device 105 is provided beneath the movable frame 100 centrally thereof and includes an oscillating member 106 and a freely rotatable driven member 107 secured to the underside of the movable frame centrally thereof to operatively receive said oscillating member 106. With this arrangement, it will be appreciated that the eccentric rotary motion of the oscillating member 106 causes a gyratory oscillation of the movable frame 102 in a horizontal plane by way of the driven member 107. A ladle 108 is placed on the movable frame 102 and held in place for example by clamp means 109.

A multiplicity of coiled springs 110 are arranged between the stationary frame 101 and the movable frame 102 in circumferentially spaced-apart relation to each other for the purpose of restraining any exorbitant motion of the movable frame 102 while allowing its gyratory oscillation, thus to impart the frame 102 a resilient oscillation.

In this form of apparatus, the springs 110 are not arranged so as to directly interconnect the movable and stationary frames. The movable frame 102 has a circular peripheral wall 111 the outside of which is formed to receive an annular strap 112 having opposite ends bent radially outwardly to form support lugs 113 as shown in FIG. 9. A trapezoidal cotter 115 is inserted between the support lugs 113 with tapered liners 114 interposed between the cotter 115 and each of the support lugs 113. A pin 116 extends horizontally through the members 113–115 resiliently to clamp them together by way of springs 117. It will be recognized that by rocking the cotter 115 about the pin 116 the spacing between the lugs 113 may be varied within certain limits thereby to tighten or loosen the annular strap 112 about the movable frame. When the strap is loosened, the movable frame 102 embraced thereby may be rotated together with the ladle 108 in a horizontal plane to adjust the angular position of the vertical plane in which the ladle is tiltable. When the adjusting procedure has been completed, the strap may be tightened to secure it to the movable frame. Arm brackets 118 and 119 are secured to the periphery of the annular strap 112 and the stationary frame 101, respectively, at equal angular intervals so as to alternate with each other. Coiled springs 110 are arranged between the adjacent arm brackets 118, 119 to resiliently restrain the movable frame 102 while allowing the angular adjustment thereof.

As will be understood, an annular ring 120 may be employed in place of said annular strap 112 to serve the same purpose. In this case, however, a toothed rack 121 is formed about the periphery of the movable frame 102 and a pinion 122 is mounted on the annular ring 120 in meshing arrangement with said toothed rack 121 for the purpose of circumferentially driving the movable frame 102. In short, this form of apparatus is featured in that the coiled springs are connected to an annular member fitted over the periphery of the movable frame instead of being connected directly to the movable frame, which is to be resiliently restrained by the springs while being allowed to rotate relative to the annular member when required. With such arrangement, the ladle can be resiliently oscillated and the plane in which the ladle is tiltable may be angularly displaced as desired to facilitate the ladle operation.

Figure 11:
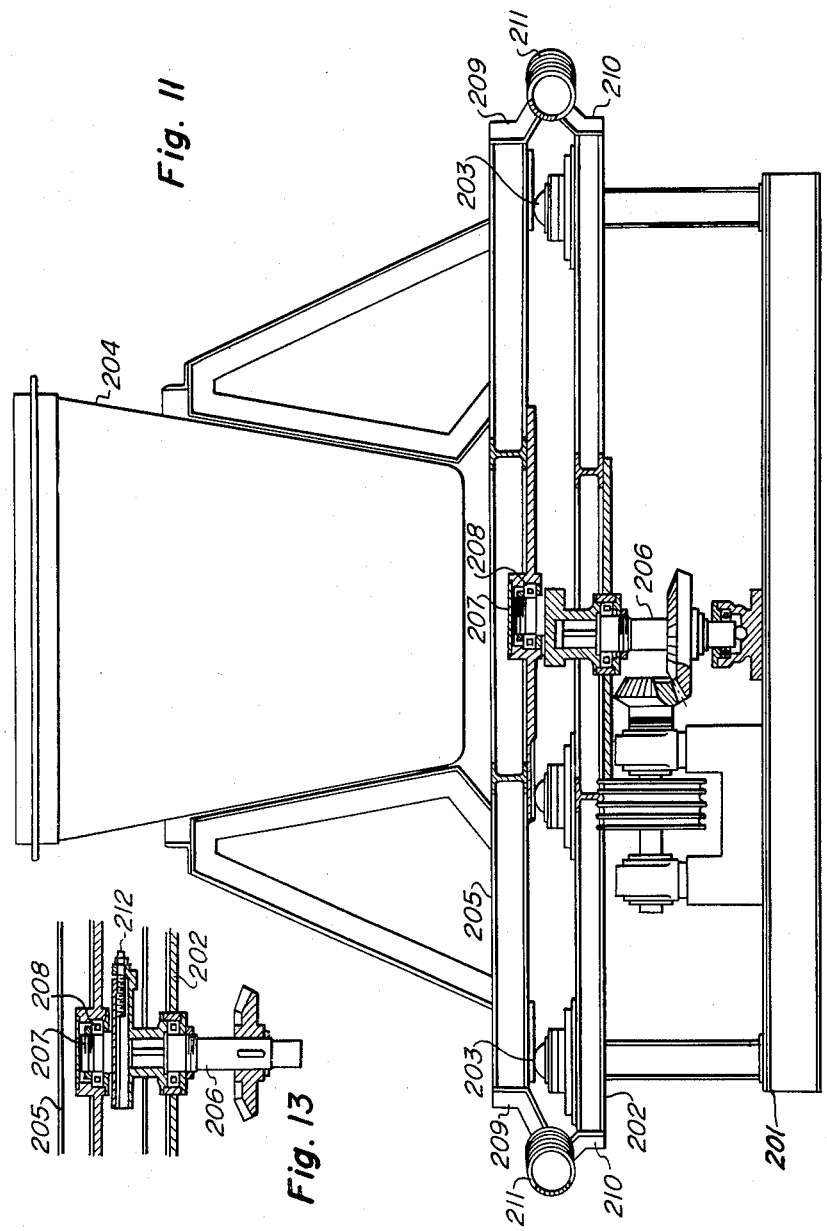
FIG. 11 is an elevation, partly in cross section, of a further modification of the inventive oscillating apparatus.
Figure 12:
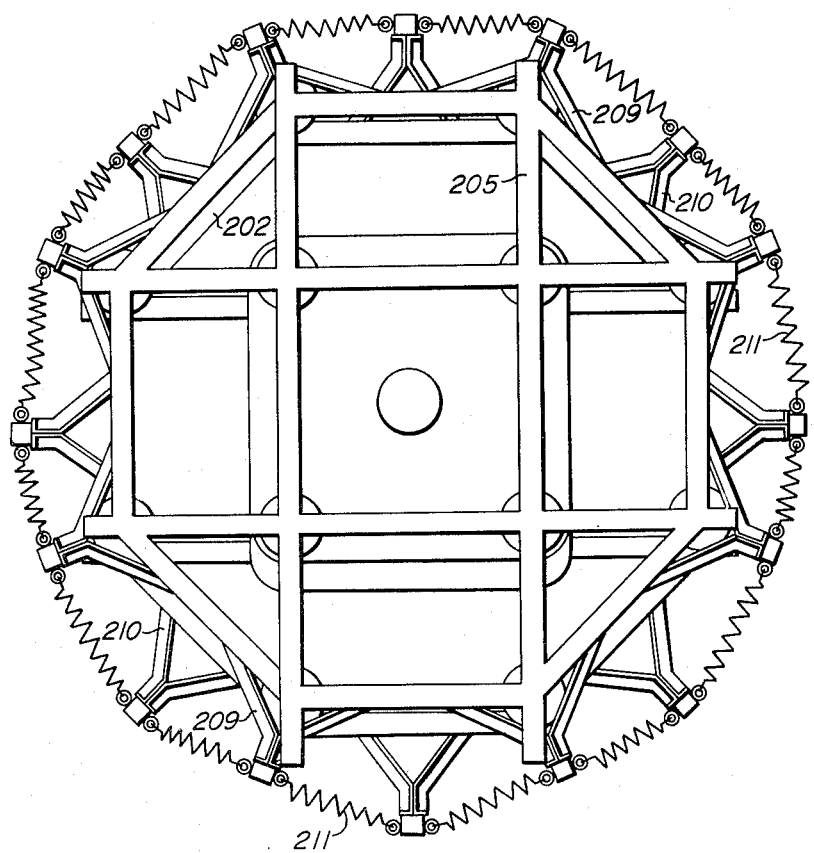
FIG. 12 is a plan view of same with the ladle removed.

The function of spring means interconnecting the movable and stationary frames as described above will now be described in more detail in connection with a further embodiment of the oscillatory stirring apparatus shown in FIGS. 11, 12 and 13, in which the eccentricity of the oscillatory movement is invariable.

This apparatus includes a stationary frame 202 mounted on the machine base 201 and having a number of freely rotatable balls 203 arranged circumferentially on the frame 202 in spaced-apart relation to each other. A movable frame 205, which is adapted to support a stirring vessel 204 thereon, is mounted on the freely rotatable balls 203. As will readily be understood, the movable frame may be moved smoothly and lightly in a horizontal plane owing to the free rotatability of the balls 203.

A rotary shaft 206 is vertically mounted centrally of the stationary frame 202 and carries at the top an eccentric pin 207, which in turn is pivotally fitted in the center of the movable frame 205 by way of a bearing 208. The rotation of the eccentric pin 207 causes the movable frame to effect said horizontal movement, as will readily be understood. Referring to FIG. 12, support arms 209 and 210 are secured to the periphery of the stationary frame 202 and the mounting frame 205, respectively, so as to alternate with each other. Coiled springs 211 are arranged in tension between the ends of the adjacent support arms 209 and 210, as shown.

As long as the coiled springs 211 are arranged uniformly about the periphery of the stationary and movable frames, the frames 202, 205 are normally positioned to align with each other under the resilience of the springs 211. Accordingly, when the movable or mounting frame 202 is rotated in a horizontal plane, the rotary movement is resiliently restrained by the springs 211. The resilient energy built up in the springs when the latter are stretched is subsequently released to impart a secondary oscillation to the mounting frame 205 in addition to the gyratory motion imparted thereto by the crankshaft. The resultant motion of the mounting frame and the ladle thereon tends to develop circumferential forces, which cause vortical motion of the fluid in the stirring vessel. If the rotation of the crankshaft is interrupted and reversed at the peak of such vortical fluid motion, there occurs some turbulence with some attendant including motion because of the combination of the remaining vortices with the gyratory motion of the fluid freshly caused in the opposite direction. The turbulent motion of the fluid continues for a while and then is transformed into gyratory vortical motion in said opposite direction. These sequential fluid motions have an excellent stirring effect upon the bath particularly when repeated cyclically. In the above, description has been made in connection with the apparatus having an eccentric pin of a fixed eccentricity, but the same effect may also be obtained when an eccentric pin is employed the eccentricity of which may be adjusted for example by operating an adjusting screw 212 as illustrated in FIG. 13.

A preferred form of the ladle usable on the apparatus of the present invention will now be described with reference to FIGS. 14 and 15. The ladle or vessel for containing a molten metal bath as employed on the inventive apparatus is subjected to a simple rotary movement or an eccentric rotary movement or other gyratory movement in a horizontal plane to stir the bath contained in the vessel. The preferred form of the ladle illustrated in FIGS. 14 and 15 is designed to have an improved stirring effect by directing the melt tending to rise along the inner peripheral surface of the vessel under the influence of the centrifugal force developed by the rotation of the vessel toward the axis thereof thereby to forcibly cause a kind of convection in the bath.

Figure 14:
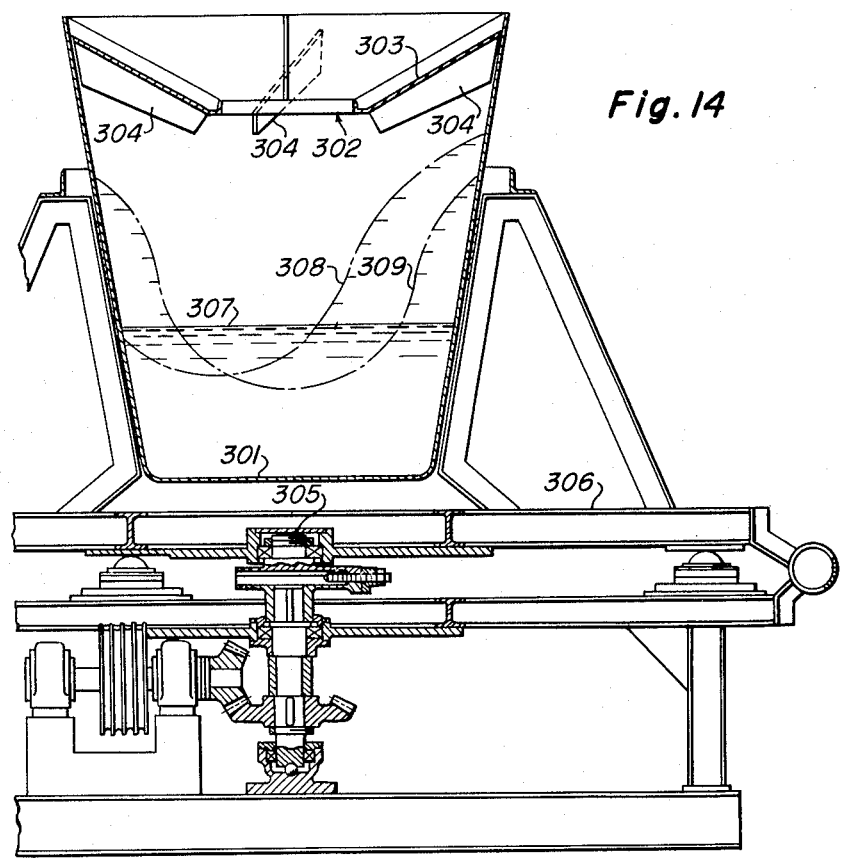
FIGS. 14 and 15 illustrate a ladle suited for use on the apparatus of the invention, representing an elevational view, partly in section, of the apparatus with such ladle mounted thereon and an enlarged plan view of the ladle, respectively.
Figure 15:
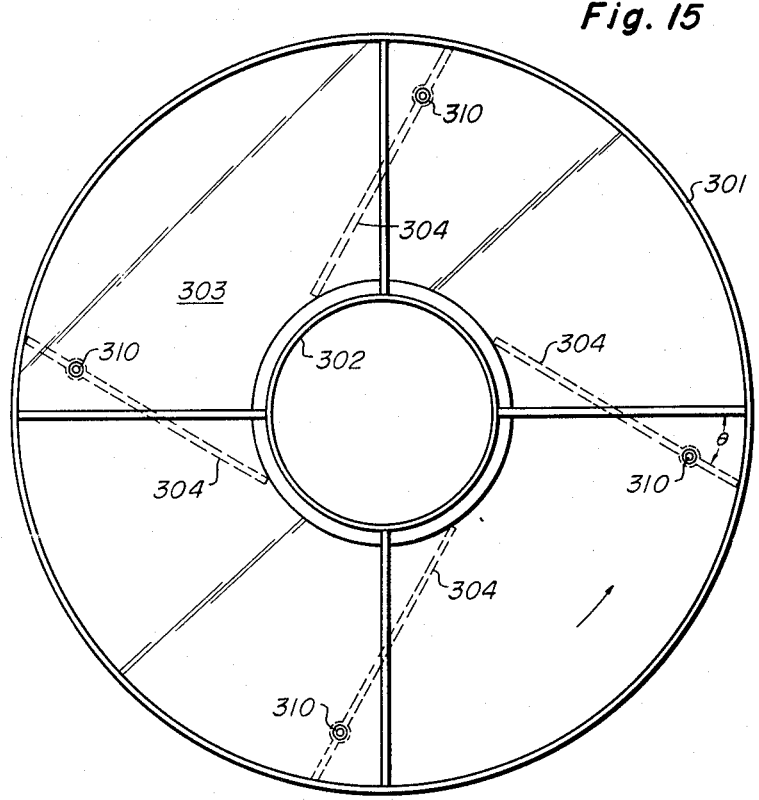

The vessel includes a cylindrical or upwardly divergent frustoconical body 301 with a generally annular cover structure 303 secured to the inside of the body adjacent to its top. As illustrated, the structure has a central opening of an appropriate diameter and is shaped like a lamp shade the annular wall of which is downwardly inwardly inclined. A number of baffles or guide blades 304 are secured to the underside of the annular wall at a suitable angle $\theta$ to the radial direction.

Where the ladle constructed as described above is placed on a movable frame 306 which is arranged to be eccentrically rotated in a horizontal plane by a crankshaft 305, as illustrated in FIG. 14, the level of melt 307 in the vessel when it is gyrated in a horizontal plane rises along the inner periphery of the vessel as indicated by the dot-dash lines 308 and 309 until it reaches the deflecting or cover structure 303. Thereafter, the melt impinging against the guide blades 304 is deflected by the latter to form divergent streams flowing downward to the axis of the vessel and finally descends therealong in the form of a jet-like torrent. Such motion of the melt is repeated and the melt is stirred and mixed uniformly in an effective manner. Thus, by use of the ladle described above, even an additive having a small specific gravity can be mixed uniformly into the melt. Furthermore, the melt in the ladle will not splash out of the ladle even when it is rotated at high speed. It will thus be appreciated that a highly improved stirring efficiency may be obtained with the inventive apparatus carrying a ladle of construction as described by operating the apparatus at high speed.

A further embodiment of the apparatus of the present invention will be described below with reference to FIG. 16.

Figure 16:
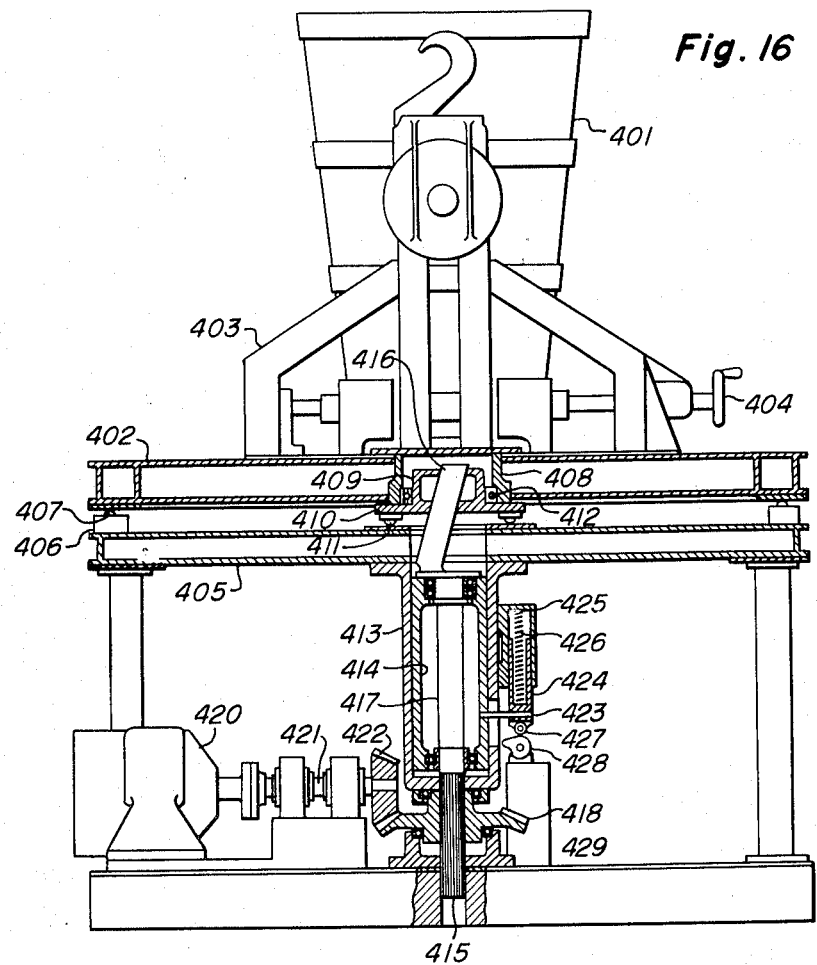
FIG. 16 is an elevational view, partly in section, of a further modified form of the apparatus according to the invention.

In contrast to the embodiment shown in FIG. 6, which is designed so that the eccentricity of its eccentric drive means is controlled by raising and lowering the drive shaft by hydraulic means, the apparatus shown in FIG. 16 is designed so that the drive shaft is raised and lowered by pure mechanical means.

In FIG. 16, a ladle 401 is placed on a movable frame 402 by way of support brackets 403 mounted thereon. The ladle is held in place on the movable frame 402 with the bottom portion of the ladle clamped by means including a hand wheel 404. The movable or mounting frame 402 is mounted on a number of support blocks 406, which are arranged circumferentially on a stationary frame 405 of the apparatus in suitably spaced-apart relation to each other by freely rotatable balls 407 mounted on said respective support blocks 406.

Secured to the mounting frame centrally thereof is a lap 408 in which is fitted an eccentric sheave 409 having a radially extending bottom flange 410, which carries a number of freely rotatable balls 411. The eccentric sheave 409 is supported by the stationary frame 405 by way of these balls 411, as illustrated. The lap 408 is rotatable relative to the eccentric sheave 409 by the provision of a ball bearing 412 therebetween.

A hollow cylinder 413 is secured to the stationary frame 405 centrally thereof. A crankshaft 417 is fitted in the cylinder 413 with a bearing sleeve 414 interposed therebetween. The crankshaft 417 is splined at the bottom as at 415 and has a top portion taking the form of an inclined pin or crank 416 adapted to fit in the sheave 409. A bevel wheel 418 is mounted fast on the splined portion 415 of the crankshaft for the purpose of rotating the latter. A bevel pinion 422 in mesh with the bevel wheel 418 is secured to a rotary shaft 421, which is rotated by a drive motor and speed change gear 420. With this arrangement, the rotation of the bevel wheel 418 causes eccentric rotation of the lap 408 and hence the ladle-mounting frame 402 with the ladle 401 thereon. As a result, the melt in the ladle is subjected to centrifugal forces caused by such eccentric rotation of the ladle to effect swirling motion.

As an important feature of this apparatus, the bearing sleeve 414 fitted in the cylinder 413 is arranged for vertical movement and has a laterally extending rod 423, which extends through an elongated slot formed in the adjacent wall of the cylinder 413 exteriorly thereof. A tubular plunger 424 is secured to the outer end of said rod 423 for vertical movement therewith. The tubular plunger 424 is fitted in a cylindrical guide 425 secured to the adjacent side of the cylinder 413 with a compression spring 426 nested between the plunger 424 and the guide 425, as illustrated. A roller 427 or other follower member is secured to the bottom of the plunger 424 to engage a cam 428 arranged thereunder. The cam 428 is mounted on a drive shaft horizontally mounted on a suitable support 429.

In operation, as the cam 428 is continuously rotated, the plunger 424 is vertically reciprocated under the bias of the spring 426 to cyclically vary the eccentricity of the inclined pin or crank 416 with the result that the ladle-mounting frame 402 is oscillated while varying the amplitude of such oscillation. In other words, the gyratory motion of the ladle has an eccentricity varying within certain limits as determined by the lift of the cam 428. Therefore, violent vortical motion as well as mixing motion is repeatedly imparted to the melt in the ladle. After a vortical motion of the melt has started, it is no longer any sense to vary the amplitude of the gyratory motion of the ladle or to increase the speed of rotation thereof. With such cam mechanism, the vortical motion of the melt and waves attendant to such motion can be effectively maintained even when the eccentricity of the gyratory motion of the ladle is rapidly decreased to a minimum after the eccentricity has reached a predetermined value, as long as such variation in eccentricity is cyclically repeated. Also, even after the eccentricity has been decreased to its minimum and correspondingly the cam motion as well as the gyratory motion of the ladle has been interrupted, the vortical motion of the melt continues for some length of time on account of the inertia of the melt mass depending upon the physical properties of the melt and materials added thereto. If the crank motion is subsequently restarted this time in the opposite direction while driving the cam in the same direction as before, the vortical motion of the fluid previously maintained is transformed into a turbulence with attendant including motion. As a result, the center of gravity of the fluid mass is displaced additionally to cause a wobbling motion of the fluid. However, it has been found that the stirring operation can be effectively performed in a limited length of time by utilizing an impetus again to cause vortical motion of the fluid at any desired time during the period in which the amplitude of gyratory movement of the ladle is increased and thereafter repeating the cyclical change of the eccentricity and the rotation of the ladle in opposite directions.

What is claimed is:

1. A method of stirring a molten metal in a vessel, comprising revolving the vessel eccentrically relative to its own axis and alternately in one direction and the other.

2. A method of refining a molten metal in a vessel, comprising the steps of adding to the molten metal at least one agent selected from the group consisting of an alloying additive, a desulfurizing agent, a material contributive to dephosphorization and a material contributive to desiliconization and eccentrically revolving said vessel, alternately in one direction and the other.

3. A method of producing spheroidal graphite cast iron comprising the steps of adding a graphite spheroidizing agent to a cast iron melt contained in a vessel and eccentrically revolving the vessel alternately in one direction and the other.

4. A method according to claim 1, in which the vessel has its own axis inclined at an angle with respect to a vertical axis so that the central axis moves along a conical path.

5. A method according to claim 1, in which the vessel axis is vertical.

6. A method of stirring a molten metal in a vessel, said vessel having its axis vertical and being held against rotation on its own axis, comprising eccentrically revolving said vessel alternately in one direction and the other, said revolving in the other direction being effected after the motion of the molten metal has become vortical to preclude any substantial mixing action.

7. A method of refining a molten metal in a vessel, said vessel having its central axis vertically directed and being held against rotation on its own axis, comprising the steps of adding to the molten metal at least one treating agent, and eccentrically revolving said vessel alternately in one direction and the other, said revolving reversal being effected after the motion of the molten metal has become vortical to preclude any substantial mixing action.

8. A method of producing spheroidal graphite cast iron comprising the steps of: adding a graphite spheroidizing agent to a cast iron melt in a vessel having its axis vertical and held against rotation on its own axis, and eccentrically revolving said vessel alternately in one direction and the other, each revolving reversal being effected after the motion of the molten metal has become vortical to preclude any substantial mixing action.

9. A method of stirring a molten metal in a vessel, comprising revolving the vessel eccentrically relative to its own axis, in one direction, for a sufficient time and at a speed sufficient to enable the molten metal to form a vortex with all of the molten metal moving in said one direction, reversing the direction of revolving of said vessel, and revolving the vessel in the reverse direction for a sufficient time at a speed sufficient to enable the molten metal to form a vortex with all of the metal moving in said reverse direction.

10. A method of stirring molten metal in a vessel, comprising revolving the vessel eccentrically relative to its own axis and alternately in one direction and the other direction with the change of direction being made after the height of the molten metal has reached a constant value for constant rotational speed.

11. A method of stirring molten metal in a vessel comprising revolving the vessel eccentrically relative to its own axis and alternately in one direction and the other direction with the change of direction being made after all of the molten metal is moving in the same direction with the vessel.

12. A method of stirring molten metal in a vessel, comprising revolving the vessel eccentrically relative to its own axis and alternately in one direction and the other direction with the change of direction being made after the molten metal has formed a vortex.

References Cited by the Examiner

UNITED STATES PATENTS

| 2,151,360 | 3/1939 | Tafel | 75—61 |
| 2,574,764 | 11/1951 | Smalley | 75—61 |
| 2,806,687 | 9/1957 | Graef | 266—36 |
| 2,875,036 | 2/1959 | Kalling | 75—45 |
| 2,962,277 | 11/1960 | Morrill | 266—36 |

BENJAMIN HENKIN, *Primary Examiner.*